HUGHE WOTITZKY
JOHN MIKULAK
*INVENTORS*

BY Daniel H. Bobis
*atty.*

HUGHE WOTITZKY
JOHN MIKULAK
INVENTORS

BY Daniel H. Bohis
Atty

Dec. 17, 1963 H. WOTITZKY ETAL 3,114,830
AUTOMATIC WELDING GUN WITH TUBE ANCHOR FOR
CENTERING AND TUBE FLARING
Filed Feb. 15, 1961 5 Sheets-Sheet 4
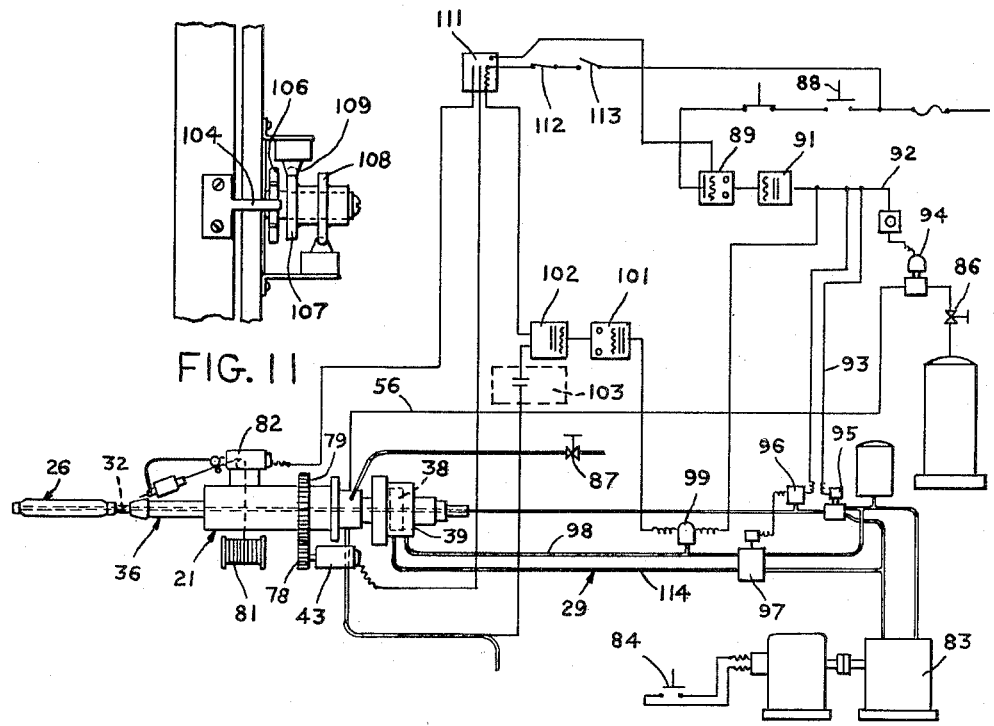
FIG. 11
FIG. 10
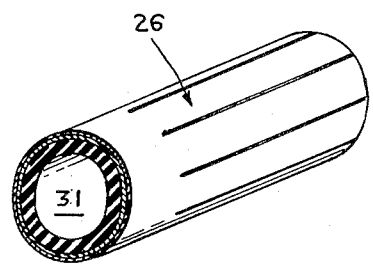
FIG. 12
HUGHE WOTITZKY
JOHN MIKULAK
INVENTORS
BY Daniel H. Bobis
Atty Dec. 17, 1963  H. WOTITZKY ETAL  3,114,830
AUTOMATIC WELDING GUN WITH TUBE ANCHOR FOR
CENTERING AND TUBE FLARING
Filed Feb. 15, 1961  5 Sheets-Sheet 5

HUGHE WOTITZKY
JOHN MIKULAK
*INVENTORS*

BY Daniel N. Bolis
atty 3,114,830
AUTOMATIC WELDING GUN WITH TUBE ANCHOR FOR CENTERING AND TUBE FLARING
Hughe Wotitzky, North Arlington, and John Mikulak, Far Hills, N.J., assignors to Worthington Corporation, Harrison, N.J., a corporation of Delaware
Filed Feb. 15, 1961, Ser. No. 89,454
2 Claims. (Cl. 219—125)

This invention relates to a hand positioned automatic gun for welding tube end to tube sheets in such structures as condensers. It comprises a removable anchor disposable inside the tube end to provide longitudinal grip against which a press means mounted on the gun reacts to press a flaring tool to flare the tube end. The flaring tool also centers the welding gun so that an automatic welding mechanism may traverse a controlled circular path about the tube end.

Use of a sufficiently long inflatable anchor to tightly contact the interior wall of the tube avoids cold working or deforming the tube while providing sufficient resistance to pull out.

Mounting a slit cylindrical shield about the inflatable anchor prevents the elongation of the inflatable anchor without adversely affecting load distribution.

When pressed into a tube end, a flaring tool is ideally situated to accommodate a heat sink medium such as circulating water to receive heat from the tube and tube sheet during the welding operation. In this position, the flaring tool also prevents the flared tube end from lifting off the countersunk rim of the tube sheet which lifting might occasion burning back of the tube or the formation of gas pockets behind the weld either of which could result in a pourous weld and leakage.

These and other advantages will be seen more fully from the accompanying drawings wherein:

FIGURE 2 depicts the welding gun in self supporting position mounted in a tube and.

FIGURE 10 diagrammatically illustrates the electro-hydraulic control employed in the welding gun.

FIGURE 11 is a fragmentary top view of the gun showing the circuit tripping device.

FIGURE 12 is a fragmentary view of the anchor showing the slitted outer cover.

Figure 13:
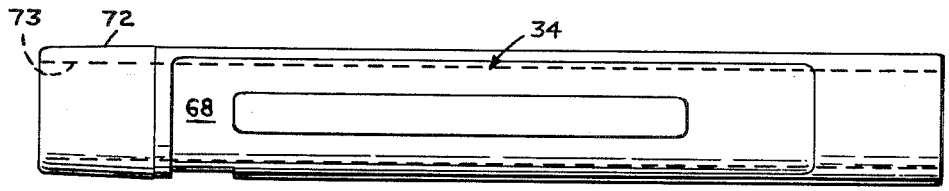

FIGURE 13 is a top view of the flaring tool without the outside cover showing the formation of the heat sink.

Figure 14:
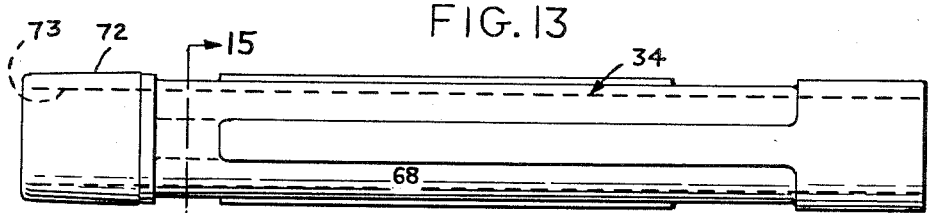

FIGURE 14 is a side view of the flaring tool.

Figures 15, 16:
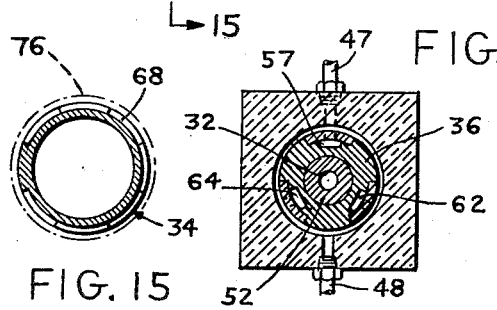

FIGURE 15 is a cross sectional view of the flaring tool taken on section 15—15 of FIGURE 14.

Figure 4:
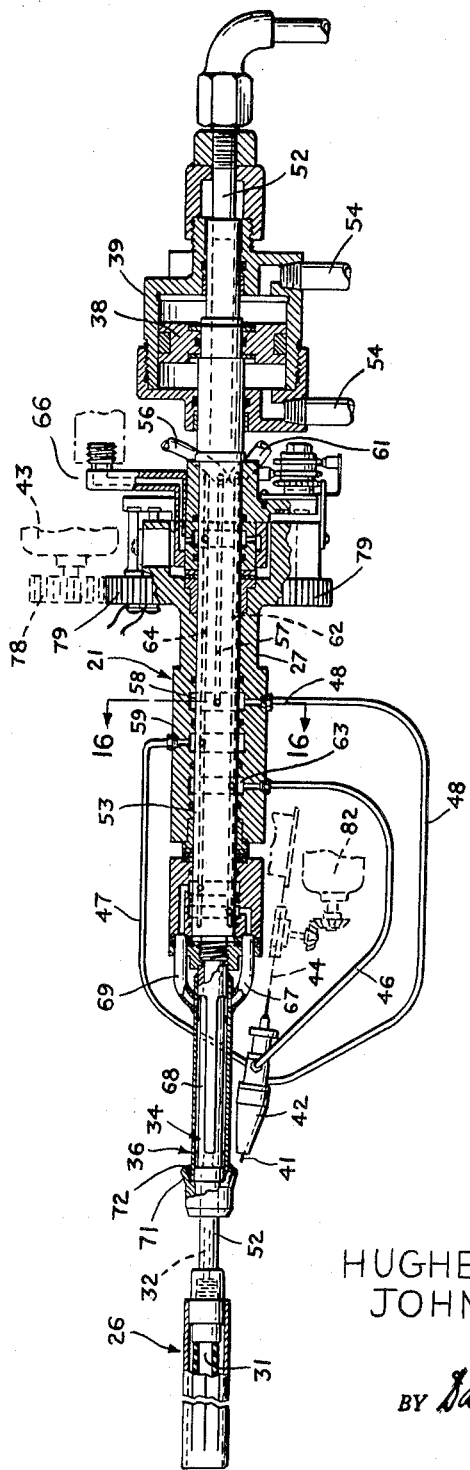
FIGURE 4 is a longitudinal sectional view of the welding gun.

FIGURE 16 is a sectional view taken along line 16—16 of FIGURE 4.

Figure 17:
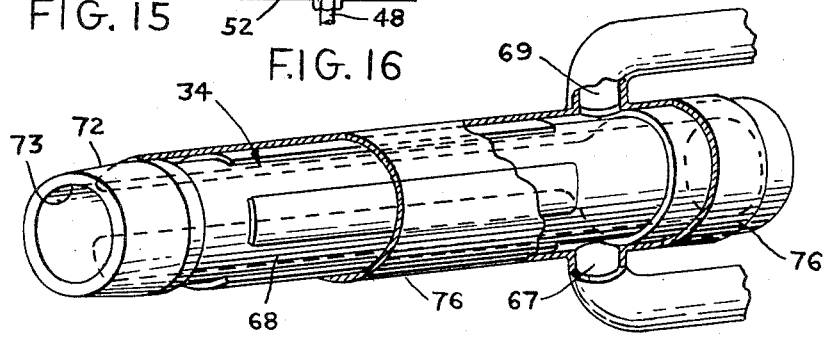

FIGURE 17 is a perspective view of the flaring tool showing the outer cover partly broken away.

Figure 1:
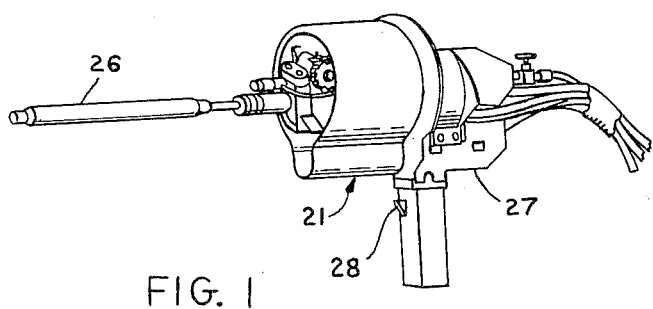
FIGURE 1 is a perspective view of an assembled welding gun.

A welding gun generally designated 21 in FIGURE 1 which includes the present advance weighs about eleven pounds with a one pound reel of welding wire; thus, it is readily handled by one operator.

Figure 2:
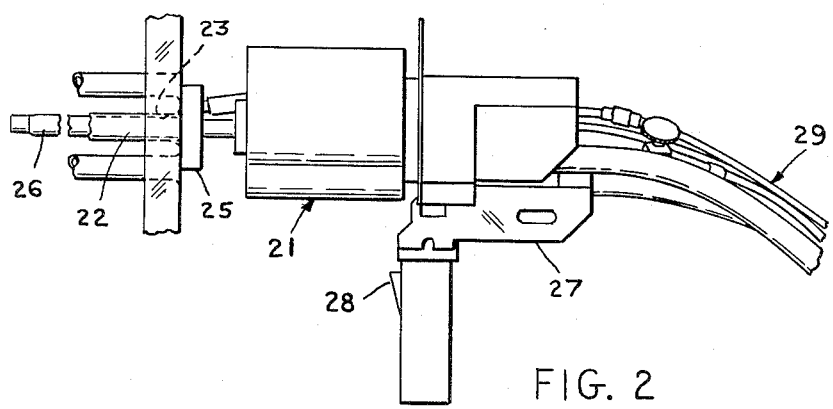
Figure 3:
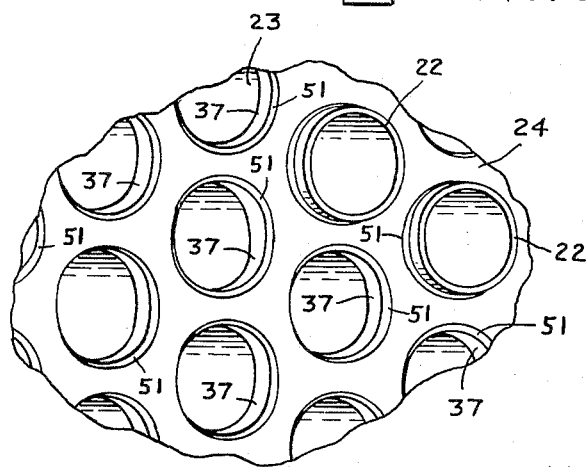
FIGURE 3 shows the beveled countersunk hole design for the tube sheet with the flat beveled periphery and the steep beveled bore. The tubes are seen to protrude through the tube sheet in position for being flared.

In assembling condensers and similar structures, tube ends 22 are disposed in a sliding fit in countersunk holes 23 in tube sheet 24 as shown in FIGURE 3. Anchor 26 connected to draw bar 52 is inserted by the operator into tube end 22. As seen from FIGURE 2, the gun is self supporting in tube end 22; so, operator fatigue is lessened. By way of requisite skill, the operator depresses a simple trigger 28, thereby beginning a completely automatic tube flaring and welding sequence. The entire operation generally takes less than eight seconds. Electro-hydraulic circuit generally designated 29 which controls the automatic operation of welding gun 21 does not impede the use of the gun over a relatively wide and unrestricted work area.

*Tube Flaring and Welding Operation*

Figure 5:
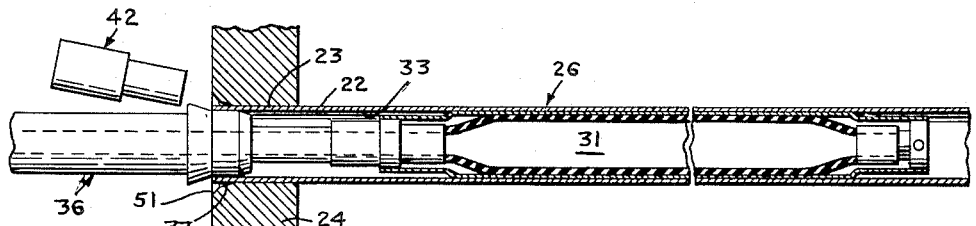
FIGURE 5 is a sectional view of the anchor in its engaged condition.

FIGURES 5 through 9 inclusive illustrate the operating sequence of the gun. Hydraulically operated anchor 26 has a normal deflated condition shown in FIGURE 9 wherein the anchor is suitable to be biased or disposed into tube ends 22. Anchor 26 defines chamber 31 therein and communicating with a source of automatically controlled fluid pressure. When anchor 26 is biased into tube end 22 as shown in FIGURE 5, attaching means which in the shown embodiment are a controlled fluid pressure are admitted to chamber 31 via central passage 32 inflating anchor 26 to its engaged condition wherein it tightly bears against the inside wall 33 of tube 22 shown in FIGURE 5.

Simultaneously with the attachment of anchor 26, an appropriate control means opens a valve which regulates a supply of inert gas employed to blanket the weld area. As shown in FIGURE 2 a barrier 25 may be used to confine the inert gas blanket. Cooling water is also admitted to a heat sink generally designated 34 in flaring tool 36 so that heat can be removed from the weld area.

Figure 6:
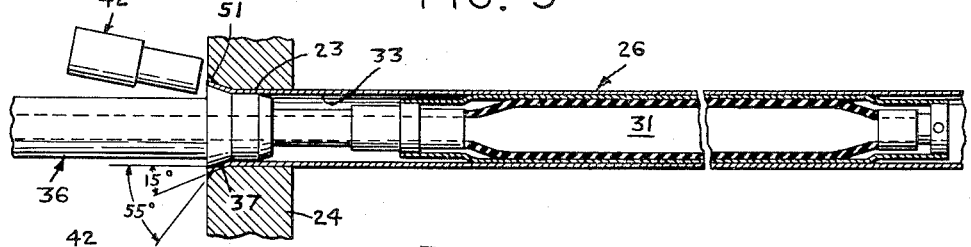
FIGURE 6 is a sectional view of the anchor with the flaring tool pressed into the tube end flaring the tube end to conforn with the steep bevel at the bore of the countersunk hole.

As seen in FIGURE 6, flaring tool 36 is pressed into tube end 22 to press tube end 22 against steep countersunk portion 37 at the bore of the countersunk rim. FIGURE 4 shows the means for driving flaring tool 36 which is piston 38 operatively disposed in piston housing 39. Suitable moveable seals are also employed.

Figure 7:
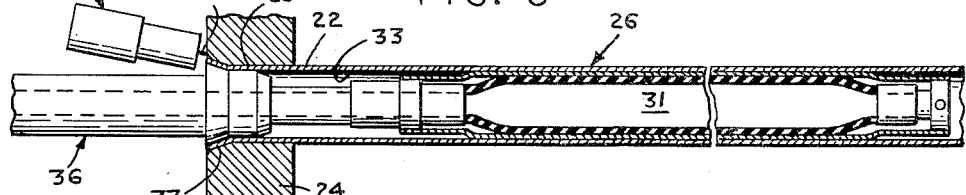
FIGURE 7 is a sectional view of the anchor with the welding head in position to weld the rim of the tube end to the tube sheet at the flat beveled periphery of the countersunk hole.

Engagement of flaring tool 36 brings electric arc tip 41 of welding head 42 into position relative tube end 22 and the countersunk rim. With flaring tool 36 firmly retaining tube end 22 against steep bevel portion 37 of the countersunk rim, and with cooling water circulating through heat sink 34, and with an inert gas blanket formed about the welding area, the electro hydraulic control circuit 29 automatically initiates the welding arc. Automatic turning means shown in FIGURE 4 as motor 43 rotate welding head 42 together with wire 44, cooling water tubes 46, 47 and inert gas tube 48 through a complete circle with approximately 20 degrees of overlap about the countersunk rim of the tube sheet. FIGURE 7 shows the welding head 42 in operative position. By the arrangement shown in the drawings, high current density in the arc promotes fast welding speeds, thereby descreasing heat input into the tube and sheet assembly and consequenctly reducing thermal distortion.

The arc weld 49 is then completed as shown in FIG-

URE 8. Anchor 26 is maintained in its inflated condition and flaring tool 36 keeps pressing tube end 22 against steep beveled portion 37 of the countersunk rim until the weld metal is cooled below 400° Fahrenheit.

Figure 9:
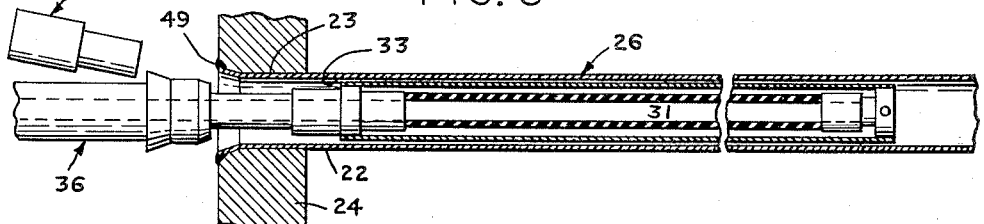
FIGURE 9 is a sectional view of the anchor after the weld has cooled showing the flaring tool removed from the tube end and the anchor moved to its disengaged condition.

After the weld is cooled, flaring tool 36 is removed by fluid pressure acting on piston 38 as best seen in FIGURE 4, and anchor 26 is deflated to its normal condition as seen in FIGURE 9 by reducing the fluid pressure in chamber 31. When anchor 26 is in its deflated condition, gun 21 may be conveniently moved by hand with anchor 26 being biased out of and into tube ends 22 successively. Maintaining anchor 26 in its engaged condition until the weld is cool automatically prevents the operator from prematurely removing gun 21 and thereby assures that the arc crater at the end of weld 49 is completely filled and remains protected with an inert gas blanket until oxidation promoting conditions subside.

Weld Design

Figure 8:
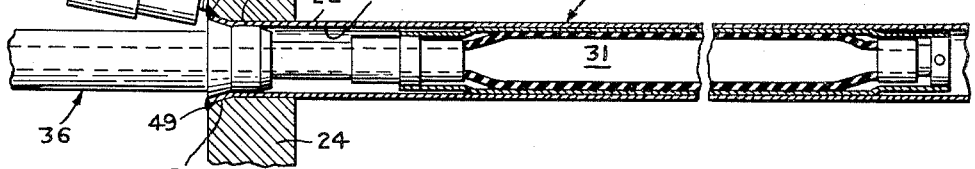
FIGURE 8 is a sectional view of the anchor with the welding operation completed. The pool of weld metal is developed in the annular recess defined between the exterior of the tube and the flat bevel at the periphery of the countersunk hole.

In FIGURES 3 and 6 are shown the tube sheet hold design. It is conventional practice to form a countersunk rim and flare tube ends outwardly so that contact is made between the outer circumference of the tube and the sheet. A hole according to the present invention is shown in FIGURE 6 with the countersunk rim defining a flatter bevel (55 degrees from the normal) at the periphery than at the bore 37 (15 degrees from the normal). As seen in FIGURE 6, flaring tool 36 uniformly flares tube end 22 approximately 15 degrees from the normal to conform to steep bevel 37. Accordingly, an annular recess is defined between the exterior of the tube and the flat beveled periphery 51 of the countersunk rim (as shown in FIGURE 7) to receive a weld pool therein (as shown in FIGURE 8) for joint flatness and to improve joint strength over that of the tube itself. The steep bevel 37 at the bore facilitates flaring. Further, the steep bevel insures joint contact to produce desirable thermal conditions for welding and also facilitates cooling.

Being able to use an arc process for welding tubes 22 to tube sheet 24 in this application offers improved bead shape. The weld metal is a bare wire 44 through which welding current is conducted. The addition of metal to the joint from the weld wire reduces the vulnerability of the weld joint quality to variations in fit up. Deoxidizing elements are introduced into the pool through the weld wire to provide a cleansing action, decreasing sensitivity of weld quality to variations in joint cleanliness. Due to the refined control of the arc pool, small leaks can be repaired while a condenser is under hydrostatic test pressure without the necessity for it to be drained and refilled for a retest.

Gun Structure

Gun 21 is built about a draw bar 52. Central pressure passage 32 is provided through the length of draw bar 52 to communicate fluid to chamber 31 in anchor 26.

To operate the flaring tool a stationary piston housing 39 is connected to draw bar 52. Piston stem 53 is telescopically mounted about draw bar 52 and is connected to piston 38. Pressure fluid communicating means 54 are provided on both sides of piston 38 to selectively press and release flaring tool 36 in tube end 22.

To blanket the weld area, inert gas is introduced at 56, and travels passage 57 formed in piston stem 53 to annular recess 58 which accommodates the rotation of drum 59. The inert gas then passes through inert gas tube 48 to welding head 42.

In cooling the welding head 42, water is introduced at 61. It travels passage 62 to annular recess 63 which accommodates the rotation of drum 59. The water then passes through water tube 46 to welding head 42 and via tube 47 to passage 64 for exit from port 66.

Cooling water for the flaring tool enters conduit 67 from passages 68 formed in flaring tool 36 to remove heat. The water is returned to passage 64 via conduit 69 for subsequent exit via port 66.

The organization of the gun is graphically integrated in FIGURE 16. Central pressure passage 32 admits fluid pressure to chamber 31 for inflation of anchor 26. Draw bar 52 holds gun 21 for the reaction of piston housing 39 required in pressing flaring tool 36 into tube ends 22. The cylindrical shape of the flaring tool 36 permits the rotation of drum 59 with welding head 42 and associated apparatus mounted thereon. Longitudinal passages are provided at 62 for the admission of cooling water, at 64 for the removal of cooling water and at 57 for the admission of inert gas.

FIGURES 13, 14, 15 and 17 show the fabrication of flaring tool 36. Flaring anvil 71 as seen in FIGURE 4 is press fit onto end 72. Draw bar 52 extends through bore 73 to support anchor 26. Heat sink 34 comprises passages 68 which are provided to accommodate water for heat removal. As seen in FIGURE 15, a cover 76 closes heat sink passages 68.

Stationary motor 43 connected to draw bar 52 drives drum 59 by means of pinion 78 and gear 79. Welding head 42 is connected to drum 59. Adjustment means are provided to position welding head 42 at appropriate radial distances to accommodate different tube diameters. Wire reel 81 as seen in FIGURE 10 and feed motor 82 are fastened to rotatable drum 59.

Control Circuit

As seen from the circuit diagram, FIGURE 10, in operating welding gun 21, pump 83 is started by closing switch 84. Inert gas valve 86 and cooling water valve 87 must be open. When anchor 26 is inserted into a tube end which is to be welded to a sheet, the start trigger 88 situated on the gun handle is manually actuated. Timer 89 is normally closed, so on being energized relay 91 admits current to lines 92 and 93. Line 92 energizes the circuit including solenoid valve 94 which opens admitting inert gas to port 56 purging the gas system and laying a blanket of inert gas over the weld area. With line 93 energized, the circuit including solenoid valve 95 is completed thereby opening the pressure line admitting fluid under pressure to control passage 32 to expand anchor 26. Pressure builds up in central passage 32 closing pressure switch 96 which completes the circuit to solenoid valve 97. Solenoid valve 97 opens pressure line 98 which communicates with piston housing 39 so that piston 38 and with it flaring tool 36 will be forced into tube end 22 pressing tube end 22 against steep bevel 37 at the bore of the countersunk rim to flare tube end 22. In so doing, pressure in line 98 will be built up so that pressure switch 99 closes the circuit which includes start relay timer 101 to energize start relay 102. Thus, the circuit will be closed to the weld contactor rectifier 103 and to the drum rotating motor 43 and wire feed motor 82 on drum 59.

After a full revolution, finger 104 mounted on rotating drum 59 engages sprocket 106 turning with it the two cams 107 and 108 connected on a common shaft with sprocket 106. Micro switch 109 is tripped closing the normally open contact 113 and thus time delay relay 111 is energized. A normally closed contact in relay 111 in series with the feed wire motor circuit opens and consequently motor 82 stops feeding wire. Another contact in relay 111 which is normally open closes a parallel circuit which continues to feed current to motor 43 so that it rotates the drum through an additional revolution to return to its starting angular disposition. In this manner the weld overlap is controlled. Another normally open contact closes the circuit to timer 89. When timer 89 times out, relay 91 is de-energized. Both hydraulic valves 95 and 97 are de-energized opening central passage line 32 and return line 114 which communicates with piston housing 39. Inflated anchor 26 returns to its normal collapsed condition and flaring tool 36 is retracted. The weld contactor opens the welding current. By energy conducted through the parallel circuit to the motor 43 the gun continues to turn until on the second turn finger 104 again engages the sprocket 106. Micro switch 108 will then be tripped to disengage contact 112 and open the parallel circuit to motor 43 and the motor will stop. At this point the welding cycle is completed.

Within the context of this specification, it will be understood by those skilled in the design of welding equipment and by those skilled in the fabrication of such structures as condensers that wide changes may be made in the details of construction and the correlation of the various elements of this centering and flaring device without departing from the scope of the invention as defined in the following claims.

What is claimed is:

1. A welding gun for use with a beveled hole of a tube sheet to flare and weld a tube thereto comprising:
   (a) a frame,
   (b) a welding head adapted to carry an electrode therein disposed in spaced relationship with the frame,
   (c) means for rotating the welding head about the frame operatively associated between the frame and the welding head,
   (d) an electrode disposed in the welding head,
   (e) a source of power operatively associated with the electrode for welding the tube to the tube sheet,
   (f) means for feeding cooling water to the welding head,
   (g) means for feeding an inert gas into the area adjacent the welding head and electrode,
   (h) an expendable anchor means connected to the frame and to be disposed into the tube whereby on operation of the welding gun the anchor means expands in the tube to position and support the welding gun during flaring and welding of the tube,
   (i) a flaring tool means connected to the frame adjacent the welding head in fixed special relation thereto,
   (j) means associated with the frame to simultaneously urge the anchor means, flaring tool means and welding head in the direction of the tube whereby the flaring tool means will flare and center the tube in the tube sheet with the anchor means providing the reactive force for the flaring tool means and thereafter the welding head to be rotated about the tube so that the electrode can weld the tube to the tube sheet while the anchor means holds the welding gun in position.

2. The combination claimed in claim 1 wherein:
   (a) the frame including two telescoping tubular members at the end thereof remote from the anchor means,
   (b) a piston chamber means is formed in said frame about the telescoping members and connected to a source of pressure,
   (c) a piston means is disposed in said piston chamber means and connected to one of the tubular members,
   (d) the tubular member having the piston connected thereto at one end thereof has the anchor means, flaring tool means and welding head associated with the other end thereof,
   (e) the piston urging the connected tubular member in the direction of said tube on pressure being communicated to said piston chamber means on the side of said piston remote from the piston whereby the anchor means, flaring tool means and welding head will be simultaneously urged in the direction of the tube.

References Cited in the file of this patent

UNITED STATES PATENTS

| | | |
|---|---|---|
| 993,883 | Schickert | May 30, 1911 |
| 1,215,965 | Murray | Feb. 13, 1917 |
| 1,508,713 | Noble | Sept. 16, 1924 |
| 2,004,787 | Gillette | June 11, 1935 |
| 2,768,280 | Renaudie | Oct. 23, 1956 |
| 2,806,125 | Miller | Sept. 10, 1957 |
| 2,962,306 | Hawthorne | Nov. 29, 1960 |

FOREIGN PATENTS

| | | |
|---|---|---|
| 836,084 | Great Britain | June 1, 1960 |